(12) United States Patent
Okude et al.

(10) Patent No.: US 8,255,162 B2
(45) Date of Patent: Aug. 28, 2012

(54) METHOD AND SYSTEM FOR ROUTE SEARCHING, AND NAVIGATION APPARATUS USING THE SAME

(75) Inventors: Mariko Okude, Hitachi (JP); Masatoshi Kumagai, Hitachi (JP); Takumi Fushiki, Hitachi (JP); Koichiro Tanikoshi, Hitachinaka (JP)

(73) Assignee: Xanavi Informatics Corporation, Zama-shi (JP)

( * ) Notice: Subject to any disclaimer, the term of this patent is extended or adjusted under 35 U.S.C. 154(b) by 996 days.

(21) Appl. No.: 12/188,040

(22) Filed: Aug. 7, 2008

(65) Prior Publication Data

US 2009/0048775 A1 Feb. 19, 2009

(30) Foreign Application Priority Data

Aug. 8, 2007 (JP) ................................. 2007-206904

(51) Int. Cl.
*G01C 21/34* (2006.01)
(52) U.S. Cl. ........................ 701/533; 701/410; 701/425
(58) Field of Classification Search ........................ None
See application file for complete search history.

(56) References Cited

U.S. PATENT DOCUMENTS

| | | | | |
|---|---|---|---|---|
| 5,931,888 A | * | 8/1999 | Hiyokawa | 701/428 |
| 6,064,941 A | * | 5/2000 | Nimura et al. | 701/416 |
| 6,317,686 B1 | * | 11/2001 | Ran | 701/210 |
| 6,542,815 B1 | * | 4/2003 | Ishizaki et al. | 701/533 |
| 2004/0102899 A1 | * | 5/2004 | Kaji et al. | 701/210 |
| 2004/0215389 A1 | * | 10/2004 | Hirose | 701/209 |

FOREIGN PATENT DOCUMENTS

| | | |
|---|---|---|
| JP | 9-287968 A | 11/1997 |
| JP | 2004-333377 A | 11/2004 |
| JP | 2005-77299 A | 3/2005 |

OTHER PUBLICATIONS

Japanese Office Action dated Oct. 6, 2009 with English Translation (Six (6) pages).

* cited by examiner

*Primary Examiner* — Faris Almatrahi
(74) *Attorney, Agent, or Firm* — Crowell & Moring LLP (57) ABSTRACT

A route searching method is provided which allows drivers having mutually similar traveling purposes and preferences to find highly convenient routes by sharing their route searching know-how. A center apparatus (1) collects probe data received from an in-vehicle terminal apparatus (5). A preference parameter creating unit (14) calculates, based on the probe data, road usage frequencies according to preference items such as vehicle type, driver age and gender, and travel purpose which can be factors for route selection and stores the calculated road usage frequencies as preference parameters in a preference parameter database (15). A route searching unit (513) included in the in-vehicle terminal apparatus (5) requests the center apparatus (1) to transmit a preference parameter similar to user attribute information (519), adjusts link costs according to the preference parameter received from the center apparatus, and determines a minimum-cost route to a destination.

10 Claims, 10 Drawing Sheets

| ITEM | ENTRY | LINK 1 | LINK 2 | LINK 3 | |
|---|---|---|---|---|---|
| VEHICLE TYPE | SEDAN | 1000 | 300 | 1500 | 40 |
| | SUV | 500 | 600 | 300 | |
| | COMPACT VEHICLE | 200 | 100 | 1000 | |

⇩ NORMALIZE WITH RESPECT TO MAXIMUM VALUE IN EACH COLUMN

| ITEM | ENTRY | LINK 1 | LINK 2 | LINK 3 | |
|---|---|---|---|---|---|
| VEHICLE TYPE | SEDAN | 1 | 0.5 | 1 | 41 |
| | SUV | 0.5 | 1 | 0.2 | |
| | COMPACT VEHICLE | 0.2 | 0.17 | 0.67 | |

⇩ CALCULATE TRAVEL FREQUENCY BY VEHICLE TYPE

| ITEM | ENTRY | LINK 1 | LINK 2 | LINK 3 | |
|---|---|---|---|---|---|
| VEHICLE TYPE | SEDAN | 0.6 | 0.3 | 0.5 | 42 |
| | SUV | 0.3 | 0.6 | 0.1 | |
| | COMPACT VEHICLE | 0.1 | 0.1 | 0.4 | |

FIG. 5

| LINK ID | 5 |
|---|---|
| VEHICLE SPEED ON LINK | 50 |
| TRIP TIME ON LINK | 180 |
| VEHICLE TYPE ID | 5 (SUV) |
| VEHICLE ID | 101abc |
| DRIVER ID | 10001 |
| DATA CREATED DATE/TIME | YYYYMMDDhhmmss |
| TRAVEL DATE/TIME | YYYYMMDDhhmmss |
| GENDER | 1 (MALE) |
| AGE | 35 |
| TRAVEL PURPOSE | 3 (LEISURE) |

FIG. 10

METHOD AND SYSTEM FOR ROUTE SEARCHING, AND NAVIGATION APPARATUS USING THE SAME

CLAIM OF PRIORITY

The present application claims priority from Japanese patent application 2007-206904 filed on Aug. 8, 2007 the content of which is hereby incorporated by reference into this application.

BACKGROUND OF THE INVENTION

1. Field of the Invention

The present invention relates to a route searching method and system, and navigation apparatus in which route searching is performed based on a preference parameters calculated as road usage frequencies, representing preference degrees, according to preference items which can be factors for route selection.

2. Description of the Related Art

Probe cars have often been used to search for recommendable routes for vehicle drivers. Such probe cars are vehicles in which various devices including sensors and communication devices are installed and each of which collects data (hereinafter referred to as "probe data") such as vehicle location, vehicle traveling speed, travel distance, and route information and transmits the collected probe data to a predetermined traffic information center. There are many cases in which taxis are used as probe cars with a support of a taxi company or in which private vehicles are used as probe cars, based on contracts concluded with users, as part of a traffic information service for private vehicles.

For car navigation apparatuses, a route searching function for finding an optimum route to a destination is indispensable. Generally, in route searching, a route from a departure place to a destination requiring a minimum amount of travel time or requiring a minimum distance to be traveled is determined. A route determined as a result of route searching, however, may include a road which is seldom traveled even by local residents, for example, because the road is too narrow or includes many blind turns. Hence, route searching is required to take into consideration not only time and distance but also ease and safety of driving.

In JP-A No. H09-287968, a route searching method using vehicle travel trajectory is disclosed. In the method, route searching is performed with greater priority placed on more often traveled roads.

In JP-A No. 2004-333377, a route searching method in which commercial-vehicle travel counts are used is disclosed as a method capable of finding routes offering greater convenience, for example, ease and safety of driving. In the method, route searching is carried out so that road links on which commercial vehicle weighting exceeds a certain value are included in the route to be determined. Thus, this method makes use of commercial vehicle drivers' know-how for route selection.

According to the invention of JP-A No. H09-287968, route searching is performed based on travel trajectory of the probe car. Therefore, when a road does not exist in the travel trajectory, the conventional route is adopted. Even in cases in which roads provided with travel trajectory of the probe car are available, they cannot be reflected in a route to be determined unless the driver does not know the roads are easy and safe to travel.

In the invention of JP-A No. 2004-333377, road links frequently used by commercial vehicles are selected based on commercial vehicle travel trajectory. This results in biased route searching, that is, the route recommended as being optimum as a result of route searching always includes road links frequently used exclusively by commercial vehicles. When a commercial vehicle driver selects a route, the driver's selection is likely affected, for example, by business purposes, jurisdiction, or quota, so that the selected route is not necessarily easy and safe to travel. Different people prefer different routes with their preference affected, for example, by vehicle type, travel purpose (commuting, shopping, leisure, etc.), travel distance (time requirement), and driver gender and age. According to the invention of JP-A No. 2004-333377, behavioral inclinations of different types of drivers are not considered, so that finding a route meeting various preference of individual drivers is difficult.

The present invention has been made in view of the above problems with the known route searching methods, and an object of the present invention is to provide a route searching method, a route searching system, a center apparatus and an in-vehicle terminal apparatus which make it possible to find an easy and safe to drive, highly convenient route by making use of many pieces of general probe data so as to share the preference parameters which comprises the route searching know-how of general drivers having similar travel purposes and preferences to those of the own vehicle driver.

SUMMARY OF THE INVENTION

In the route searching method according to an embodiment of the present invention, the following steps are executed. They are the steps of: receiving location information specifying a departure place and a destination; storing preference parameters calculated as road usage frequencies, representing preference degrees, according to preference items which can be factors for route selection and selecting, out of the preference parameters, at least one preference parameter similar to user attribute data; adjusting, based on the selected preference parameter, a cost of each road link; and determining, based on the adjusted cost of each road link, a minimum-cost route from a departure place to a destination.

The preference parameters are created by classifying many pieces of general probe data into preference items (for example, vehicle type, driver age, driver gender, travel purpose, and passenger (for example, whether a child is aboard)) which can be factors for route selection and calculating probe car traveling frequencies according to the preference items.

Thus, the route searching method makes it possible for users/drivers having mutually similar attributes and mutually similar route preferences to share the same routes for traveling. This allows the route searching method to find a route matching a specific user's preference without requiring the user to have traveled on the route in a corresponding time period in the past.

The route searching system creating the preference parameter according to an embodiment of the present invention has an in-vehicle terminal apparatus which transmits travel data as probe data, the travel data including location information, time information, vehicle information such as information on brake and wiper operations, and travel environment information such as atmospheric temperature and road surface temperature information, and a center apparatus provided with a probe data storing unit which stores the probe data transmitted from the in-vehicle terminal apparatus.

The center apparatus includes a preference parameter calculation unit which classifies the stored probe data into preference items which can be factors for route selection and calculates each road-link usage frequencies, as preference degrees, according to the preference items, and a communication unit which transmits the preference parameters when requested from the in-vehicle terminal apparatus.

The in-vehicle terminal apparatus includes a location information input unit which receives location information specifying a departure place and a destination, an attribute information storing unit which stores attribute information on such items as vehicle, driver, and passenger, a communication unit which requests the center apparatus to transmit a preference parameter similar to the attribute information and receives the transmitted preference parameter, a link cost adjusting unit which adjusts a cost of each link according to the received preference parameter, a route searching unit which determines, based on the adjusted link cost, a minimum-cost route from a departure place to a destination, and a route presentation unit which presents, using a display device or by voice, route information obtained using the route searching unit to the user.

The route searching system according to an embodiment of the present invention finds a recommended route from a departure place to a destination. The system has an in-vehicle terminal apparatus which transmits travel data as probe data, the travel data including location information, time information, vehicle information such as information on brake and wiper operations, and travel environment information such as atmospheric temperature and road surface temperature information, and a center apparatus provided with a probe data storing unit which stores the probe data transmitted from the in-vehicle terminal apparatus.

The center apparatus includes a preference parameter calculation unit which calculates the road usage frequencies, based on the stored probe data, as preference degrees according to preference items which can be factors for route selection, a preference parameter storing unit which stores the calculated preference parameters, a request receiving unit which receives a request for route searching from the in-vehicle terminal apparatus, the request including attribute information on such items as vehicle, driver, and passenger and location information specifying a departure place and a destination, a route searching unit which selects, from the preference parameter storing unit, a preference parameter similar to the attribute information received from the in-vehicle terminal, adjusts costs of links to be considered in route searching according to the selected preference parameter, and determines a minimum-cost route from a departure place to a destination, and a transmission unit which transmits information on the determined route to the in-vehicle terminal apparatus.

The in-vehicle terminal apparatus includes a location information input unit which receives location information specifying a departure place and a destination, an attribute information storing unit which stores attribute information on such items as vehicle, driver, and passenger, a route request unit which requests the center apparatus to search for a route to a destination, a receiving unit which receives route information from the center apparatus, and a route presentation unit which presents, using a display device or by voice, the received route information to the user. This makes it possible for the center apparatus to determine a route taking user's preference into consideration and communicates the determined route to the in-vehicle terminal apparatus.

The navigation apparatus according to an embodiment of the present invention has a preference parameter storing unit which stores preference parameters calculated by each road-link usage frequencies, representing preference degrees, according to preference items which can be factors for route selection, an attribute information storing unit which stores user attribute data, and a route searching unit which selects a preference parameter similar to the attribute data, adjusts a cost of each link according to the selected preference parameter, and determines a minimum-cost route from a departure place to a destination. This makes it possible for the navigation apparatus to find, by itself and for the user, a route taking user's preference into consideration.

The present invention makes it possible to find an easy and safe to drive, highly convenient route by making use of many pieces of general probe data so as to share the preference parameters which comprises the route searching know-how of general drivers having similar traveling purposes and preference to those of the own vehicle driver.

DETAILED DESCRIPTION OF THE PREFERRED EMBODIMENT

Figure 1:
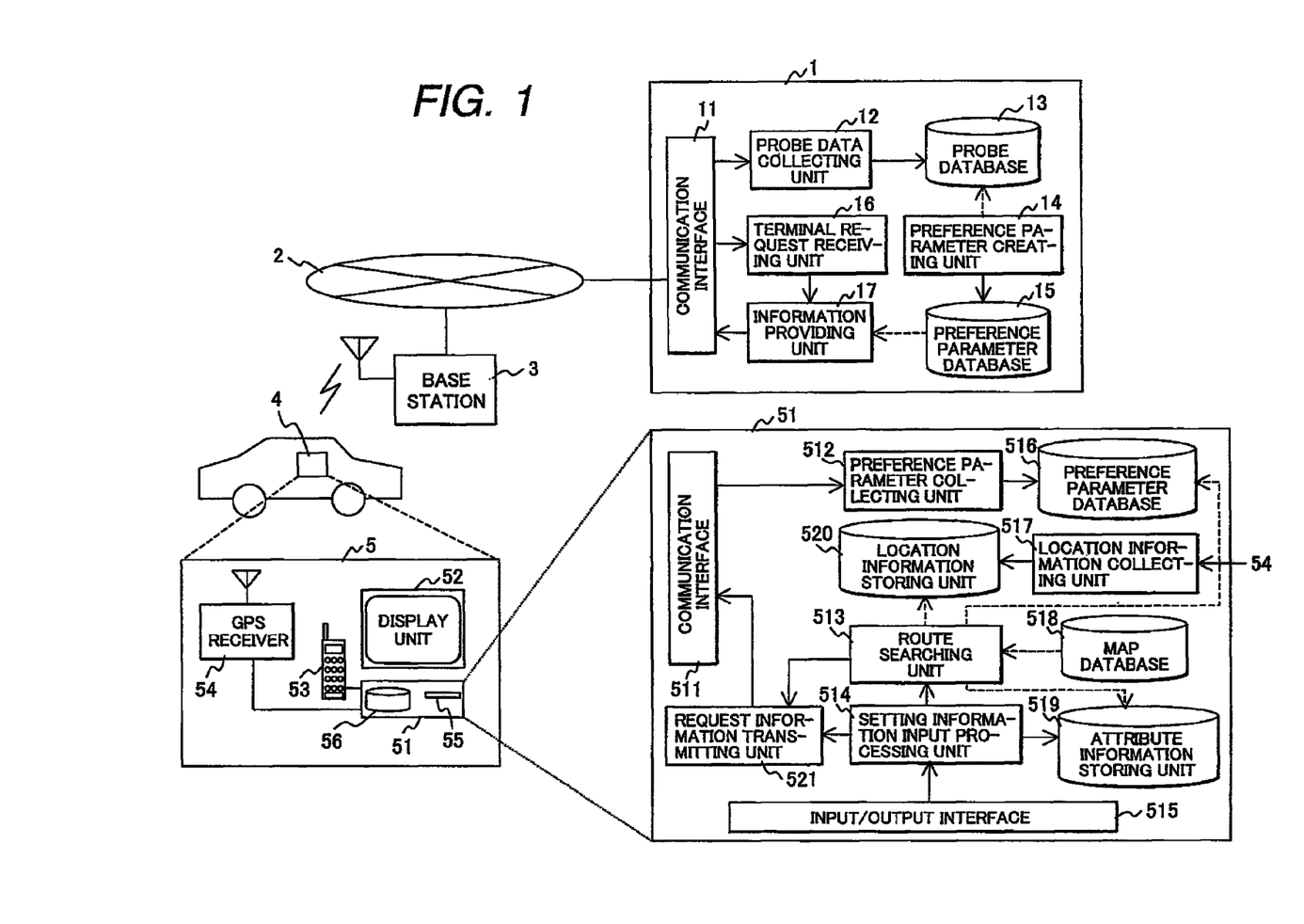
FIG. 1 is a block diagram of a route searching system according to an embodiment of the present invention.

An embodiment of the present invention will be described below in detail with reference to drawings. FIG. 1 is a block diagram showing configurations of an in-vehicle terminal apparatus and a center apparatus according to an embodiment of the present invention and an overall configuration of a route searching system to which the in-vehicle terminal apparatus and center apparatus are applied. As shown in FIG. 1, the route searching system of the present embodiment includes a center apparatus 1, a communication network 2 including Internet and a public telephone network, a base station 3 for, for example, cellular phones or wireless LAN, and an in-vehicle terminal apparatus 5 installed in a vehicle 4. The configuration of the in-vehicle terminal apparatus 5 may be included in an ordinary navigation apparatus having a function of route guidance to a destination.

[Center Apparatus]

The configurations and functions of the center apparatus 1 and in-vehicle terminal apparatus 5 will be described in detail below. The center apparatus 1 includes a computer. The computer has such functional blocks as a communication interface 11, a probe data collecting unit 12, a probe database 13, a preference parameter creating unit 14, a preference parameter database 15, a terminal request receiving unit 16, and an information providing unit 17.

The computer included in the center apparatus 1 is provided at least with an arithmetic processing unit and a storage device including, for example, a semiconductor memory device or a hard disk device. The functions of the functional blocks 11 to 17 included in the center apparatus 1 are realized by having the arithmetic processing unit execute predetermined programs stored in the storage device.

The communication interface 11 performs communication control related with the communication network 2 and exchanges data with the in-vehicle terminal apparatus 5 via the communication network 2. The probe data collecting unit 12 collects, via the communication interface 11, probe data transmitted from the in-vehicle terminal apparatus 5. The probe data is a vehicle travel trajectory in the form of point sequence data including, in addition to location information (e.g., latitude and longitude coordinate data) and time information, vehicle information on, for example, travel speed, travel direction, and braking.

The point sequence probe data collected by the probe data collecting unit 12 is stored in the probe database 13 after being converted into such items of data as the time required, vehicle speed, and traffic congestion degree on each road link or road link group. There may be cases in which the probe data collecting unit 12 collects, via the communication interface 11, the probe data already converted into data on the traveling time, vehicle speed, and traffic congestion degree on each road link.

In such cases, the information on each road link to be collected by the probe data collecting unit 12 is created at a traffic information center (not illustrated) connected to the center apparatus 1 via the in-vehicle terminal apparatus 5 or communication network 2 and transmitted to the center apparatus 1. Instead of collecting the probe data via the communication network 2, the probe data collecting unit 12 may also collect the probe data from a portable storage medium.

The preference parameter creating unit 14 classifies the probe data stored in the probe database 13 according to items which can be route selection factors (preference factors), for example, vehicle type, driver gender, driver age, driver's career, and driving purpose (for example, commuting, leisure, shopping, or pick-up/send-off transportation) (such items will herein after be referred to as "preference items"), and sets travel frequencies by such preference items on each road link as preference parameters. The preference parameters thus set may include, for example, those indicating that, of the probe cars having traveled on a road link, sedans and SUVs accounted for 20 percent and 30 percent, respectively, the sedan and SUV belonging to a preference item "vehicle type."

The preference parameters set in the preference parameter creating unit 14 are stored in the preference parameter database 15. The preference parameters are updated either at a predetermined period, for example, every five or ten minutes or every day, or at predetermined times corresponding to the period or times at which the probe database 13 is updated.

The terminal request receiving unit 16 receives request information transmitted from the in-vehicle terminal apparatus 5 via the communication interface 11. The request information is transmitted from the in-vehicle terminal apparatus 5 to the center apparatus 1 to request information. In the present embodiment, the request information is used to request preference parameters.

The information providing unit 17 functions to provide information in accordance with the request information received by the terminal request receiving unit 16. When the request information includes a request for preference parameters, the information providing unit 17 reads, from the preference parameter database 15, the latest preference parameters meeting the request information and transmits the preference parameters to the in-vehicle terminal apparatus 5 via the communication interface 11.

When the request information specifies an area and a date/time, the information providing unit 17 selects and provides the preference parameters corresponding to the specified area and date/time. Furthermore, when the request information specifies a preference item, the information providing unit 17 provides the preference parameters of the specified preference item.

[In-Vehicle Terminal Apparatus]

The in-vehicle terminal apparatus 5 installed in the vehicle 4 includes a main terminal body 51, a display unit 52, a cellular phone 53, and a GPS (Global Positioning System) receiver 54.

The main terminal body 51 is made up of a computer having an arithmetic processing unit (not illustrated), a storage device 56, and a portable storage medium connection adaptor 55. The storage device 56 includes, for example, a semiconductor memory device or a hard disk device. The portable storage medium connection adaptor 55 is composed of, for example, a DVD (Digital Versatile Disk) drive unit or a USB (Universal Serial Bus) memory reader/writer with a built-in flash memory. The main terminal body 51 may also include various types of switches, buttons, touch panel; remote controller, and audio microphone as input devices and an audio speaker as an output device.

The display unit 52 includes, for example, an LCD (Liquid Crystal Display), and displays, for example, map information and traffic information outputted by the main terminal body 51. The cellular phone 53 can wirelessly communicate with the base station 3, and wirelessly connects the in-vehicle terminal apparatus 5 to the center apparatus 1, enabling data communications between them via the base station 3 and communication network 2. The GPS receiver 54 detects the current location of the vehicle 4 by receiving radio waves from a GPS satellite (not illustrated).

The main terminal body 51 includes such functional blocks as a communication interface 511, a preference parameter collecting unit 512, a preference parameter database 516, a location information collecting unit 517, a location information storing unit 520, a route searching unit 513, a setting information input processing unit 514, an input/output interface 515, a request information transmitting unit 521, a map database 518, and an attribute information storing unit 519. The functions of these functional blocks of the main terminal body 51 are realized by having the arithmetic processing unit (not illustrated) execute predetermined programs stored in the storage device 56.

The communication interface 511 controls communications using the cellular phone 53, and exchanges data with the center apparatus 1 via the base station 3 and communication network 2. The input/output interface 515 inputs information inputted from switches and buttons (not illustrated), and outputs information to be displayed, for example, map information or route information worked out at the route searching unit 513 to the display unit 52.

The setting information input processing unit 514 sets various kinds of information, for example, specifying a destination or a request to the center apparatus 1 based on information inputted from switches and buttons via the input/output interface 515.

The attribute information storing unit 519 stores, for example, vehicle type information and driver attribute information (gender, age, etc.) set in the setting information input processing unit 514.

The location information collecting unit 517 collects GPS information, for example, latitude, longitude, altitude, and time information detected by the GPS receiver 54, and stores the information in the location information storing unit 520.

The request information transmitting unit 521 transmits, via the communication interface 511, request information to request, for example, preference parameters to the center apparatus 1. In some case, the preference parameters may be requested by a driver via the input/output interface 515, in other cases, the preference parameters are requested by the route searching unit 513 responding to a request for route searching. The request information includes area and date/time specifications specified via the setting information input processing unit 514.

The preference parameter collecting unit 512 collects, via the communication interface 511, preference parameters transmitted from the center apparatus 1, and stores the collected preference parameters in the preference parameter database 516. Though not illustrated, there are cases in which a preference parameter transmission/reception notice to the driver is outputted to the display unit 52.

The route searching unit 513 reads road network information from the map database 518 in accordance with a request for route searching made via the setting information input processing unit 514, and works out a recommended route from a departure place to a destination. Usually, in the process of working out a route, a minimum-cost route in terms of road-link-based travel time (speed) requirement or travel distance is searched for by a mathematical method, for example, the Dijkstra method.

When route searching taking a preference parameter into consideration is requested, the preference parameter is read from the preference parameter database 516, the cost in terms of travel time (speed) requirement or travel distance of each road link is corrected according to the preference parameter, and a minimum-cost route is determined.

In such a process, there are cases in which the vehicle type and user information stored in the attribute information storing unit 519 is referred to so that a preference parameter having similarity to the driver's preference can be selected. A recommended route determined with the preference parameter taken into consideration is displayed on the display unit 52.

Even though, in the embodiment illustrated in FIG. 1, a recommended route to a destination is determined in the route searching unit 513 of the in-vehicle terminal apparatus 5, a similar route searching unit may be provided in the center apparatus 1 so as to determine a recommended route with a preference parameter taken into consideration and communicate the recommended route thus determined to the in-vehicle terminal apparatus 5. In such a case, probe data obtained from the user can be used to determine user's preference.

[Route Searching Process]

Figure 2:
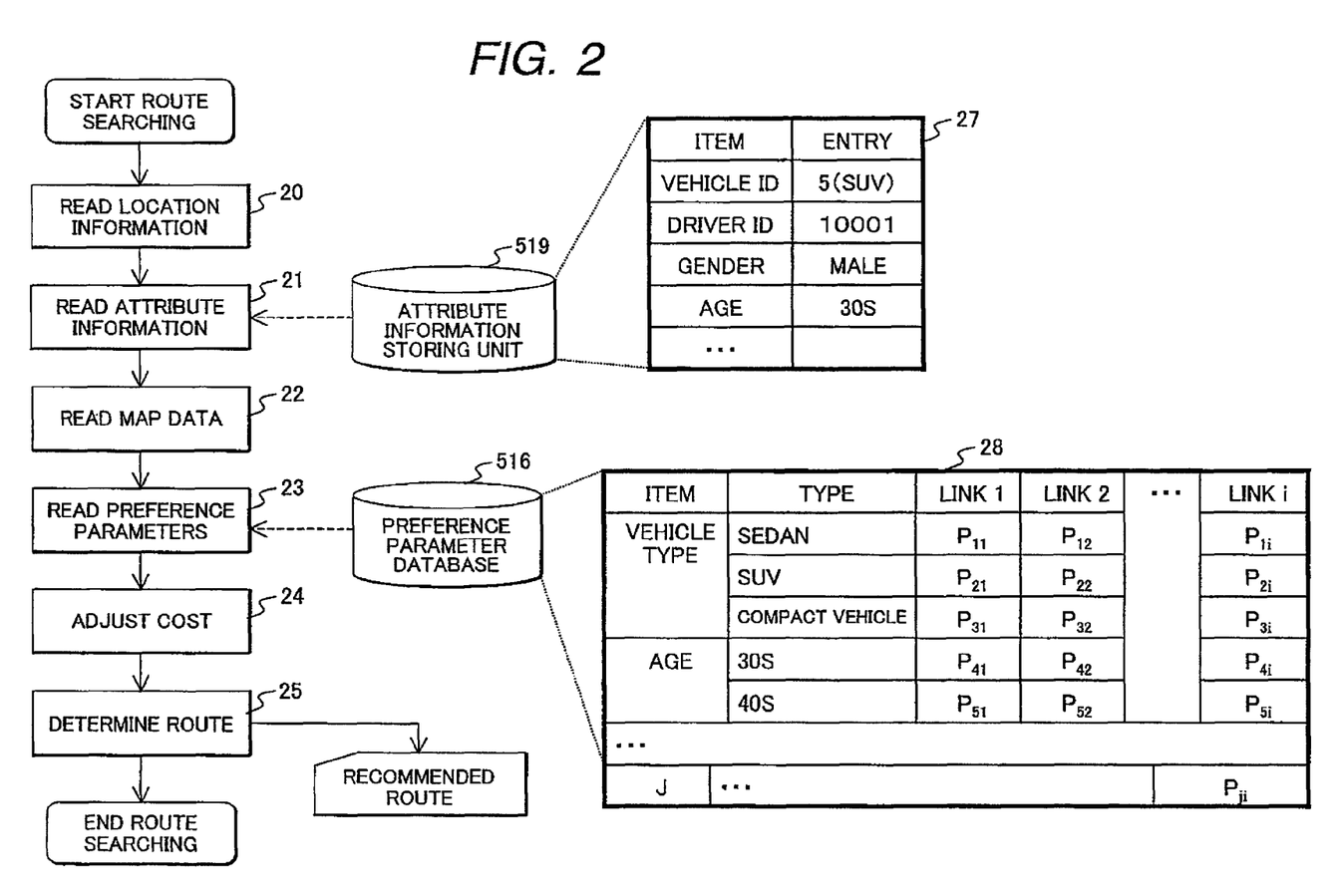
FIG. 2 is a process flowchart of a route searching unit 513.

FIG. 2 shows an example flowchart of processing performed by the route searching unit 513 according to the present embodiment of the invention. The route searching process to be performed by the in-vehicle terminal apparatus 5 as shown in FIG. 2 is started when the user requests, using a remote controller or buttons or by voice input, a route to a destination. Assume that the request specifies user's preference to be taken into consideration in searching for a route.

When a departure place, a destination, and a via point are specified for route searching, location information including via-point information is referred to. The destination and via point are given by information set by the setting information input processing unit 514. The departure place is, by default for car navigation, the current location, so that it can be obtained by referring to the GPS information (current location information) stored in the location information storing unit 520. In cases where a departure place is specified by the user, the location information set by the user is referred to (step 20).

Next, attribute information unique to the user, for example, vehicle type and user's age and gender to be treated as preference factors to be considered in selecting a route is read from the attribute information storing unit 519 (step 21). In the present embodiment, vehicle type IDS (SUV), driver ID (10001), gender (male), and age (30s) are registered as the user attribute information (Table 27).

Next, map data on the area determined based on location information specifying, for example, a departure place and destination, i.e. map data on the area to be covered in searching for a route is read from the map database 518 (step 22). Furthermore, the preference parameters corresponding to the user attribute information are read from the preference parameter database 516 (step 23). In the present embodiment, the preference items "vehicle type SUV" and "age 30s" are selected as preference parameters matching the user's preference.

Namely, when the information as listed in table 28 is stored as preference parameters, $(P_{21}, P_{22}, ---, P_{2i})$ are selected as vehicle type parameters (preference item number j=2) and $(P_{41}, P_{42}, ---, P_{4i})$ are selected as age parameters (preference item number j=4). "i" represents a unique link ID. The relevant parameters are read for every link to be covered in route searching. No preference items are selected unless they are included in both the attribute information and preference parameters. Even though, in Table 28, one parameter per reference item $P_{ji}$ is set, different parameters may be set for different time units (for example, for every hour) to reflect time-dependent traffic conditions, for example, heavy commuter vehicle traffic in the morning and evening. Also, different preference parameter tables may be prepared for different kinds of days, for example, for weekdays and holidays.

The preference parameters associated with the selected preference items are used to adjust the road link travel cost (step 24). The method of cost adjustment is dependent on the route search algorithm. In the present embodiment, the link cost is adjusted for the Dijkstra method that is generally used for route searching.

An example link cost adjustment is expressed by equation 1.

$$W'_i = \left(\sum_{j=1}^{n} \alpha_j \cdot (1 - P_{ji})\right) \times W_i. \qquad \text{Equation 1}$$

$W_i$ represents the cost of link i before cost adjustment that is equivalent to the travel time on or distance of link i. In cases where current or future traffic information can be collected from a traffic information center via the communication network 2, the link travel time (link travel speed) information provided as traffic information may be assigned to $W_i$. $W'_i$ represents the cost of link i after cost adjustment.

$P_{ji}$ represents a preference parameter corresponding to preference item j on link i. In the present example, $P_{ji}$ has a larger value when the parameter better matches the user's preference. Therefore, when determining a minimum-cost route as done in general route searching, the term $(1-P_{ji})$ is applied. To reduce the cost more when the parameter better matches the user's preference, inverse term $1/P_{ji}$ may be applied or, alternatively, a smaller value may be assigned to $P_{ji}$.

$\alpha_j$ is a coefficient assuming a larger value when the preference parameter is made to exert a larger effect or a smaller value when the preference parameter is made to exert a smaller effect. In cases where such user information as age and gender and the purpose of travel, for example, commuting or shopping, is inputted by the user, priority preference parameters may be specified based on such user information, and the specified preference parameters may be used to adjust the value of $\alpha_j$.

Suppose there are two candidate routes, link 1 and link 2. For link 1, where the travel time cost $W_1$ is 100, vehicle type parameter $P_{21}$ is 0.3, age parameter $P_{41}$ is 0.8, and coefficient $\alpha_j$ is 1, cost $W'_1$ after adjustment is calculated as follows:

$$W'_1=(1\times(1-0.3)+1\times(1-0.8))\times100=(0.7+0.2)\times100=90$$

For link 2, where the travel time cost $W_2$ is 100, vehicle type parameter $P_{22}$ is 0.7, and age parameter $P_{42}$ is 0.2, cost $W'_2$ after adjustment is calculated as follows:

$$W'_2=(1\times(1-0.7)+1\times(1-0.2))\times100=(0.3+0.8)\times100=110$$

Hence, as a result of cost adjustment made with user's preference taken into consideration, link 1 is selected as a recommended route.

If the user desires to give priority to roads preferred by drivers of the same generation as the user, and coefficients $\alpha_2$ (=1.0) and $\alpha_4$ (=0.1) are set, $W'_1$ and $W'_2$ become as follows, respectively:

$$W'_1=(1\times(1-0.3)+0.1\times(1-0.8))\times100=(0.7+00.2)\times100=72$$

$$W'_2=(1\times(1-0.7)+0.1\times(1-0.2))\times100=(0.3+0.08)\times100=38$$

Hence, link 2 is selected.

For every candidate road links, the travel cost is adjusted, and a minimum-cost route to the destination is selected based on the adjusted travel cost (step 25). The selection is outputted as a recommended route, and the route searching process is terminated.

[Creating the Preference Parameter]

Figure 3:
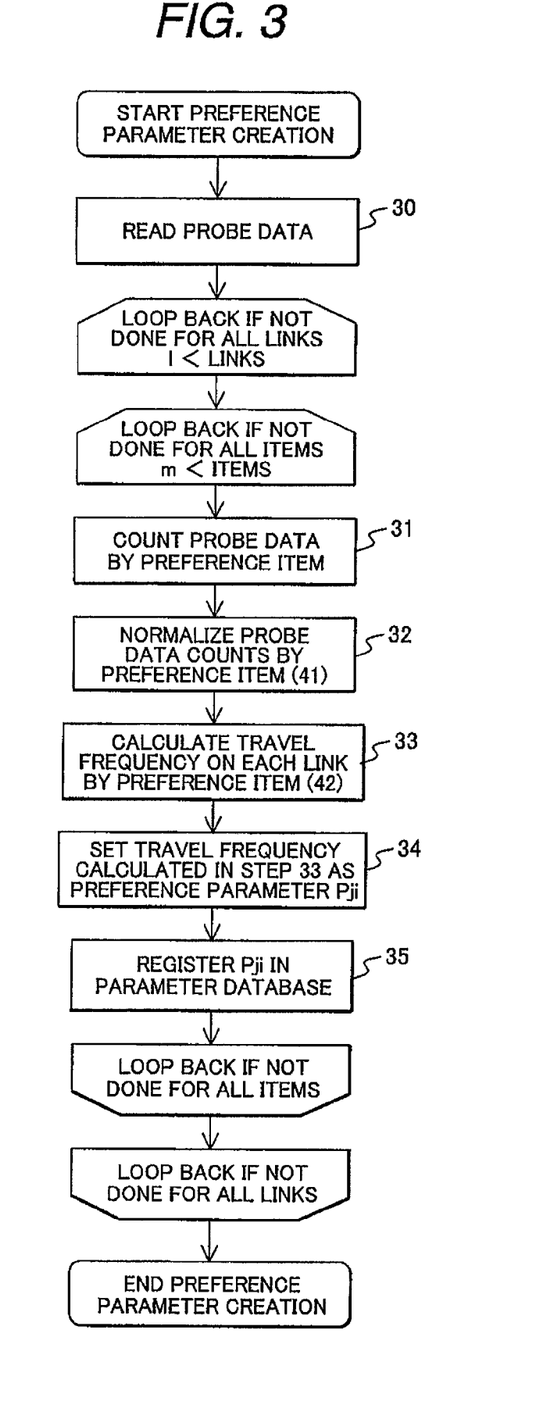
FIG. 3 is a process flowchart of a preference parameter creating unit 14.
Figure 4:
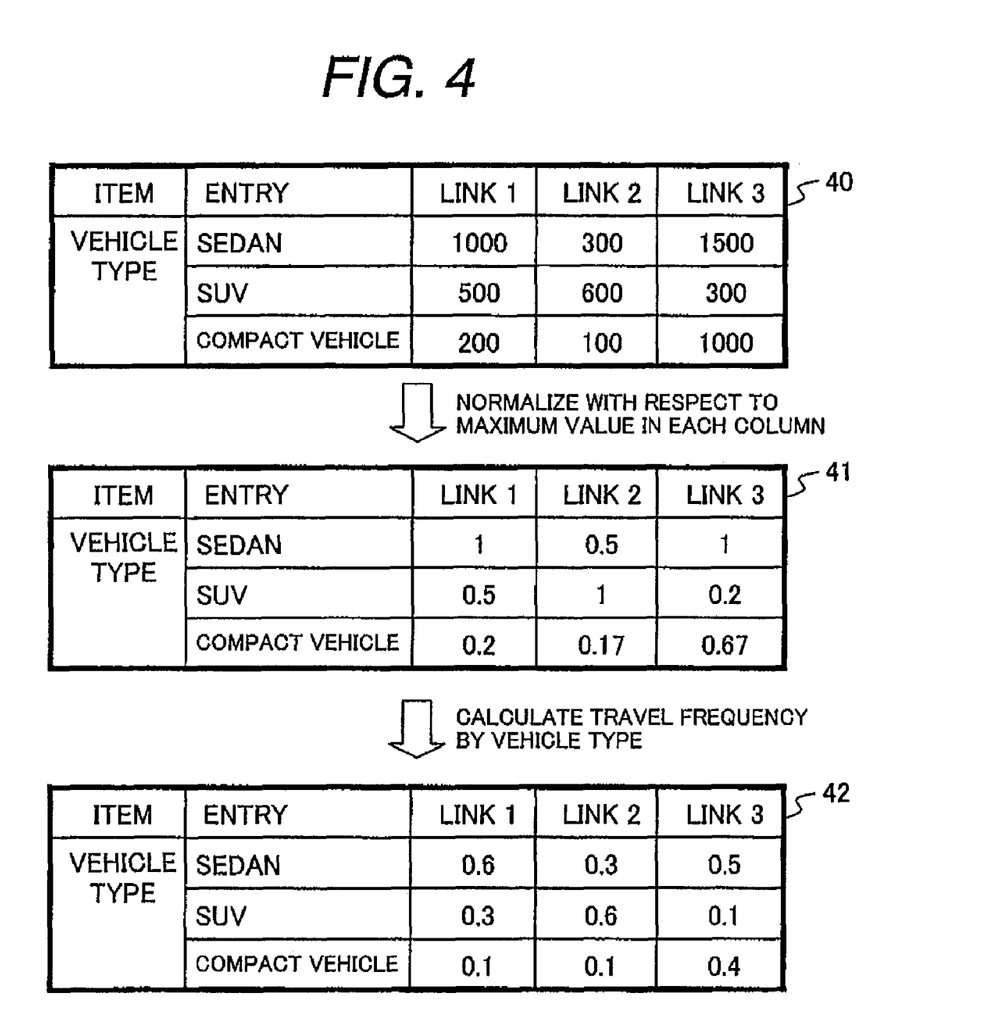
FIG. 4 is a schematic diagram for explaining the process flow of the preference parameter creating unit 14.

FIG. 3 shows an example flow of processing performed by the preference parameter creating unit 14 according to the present embodiment of the invention. FIG. 4 provides supplementary information for use in explaining the flow of processing shown in FIG. 3. The process performed by the preference parameter creating unit 14 will be described with reference to FIGS. 3 and 4.

The arithmetic processing unit of the center apparatus 1 starts a preference parameter creating process when the probe database 13 is updated or on a periodical basis. When the process is started, updated link probe data is read from the probe database 13 (step 30). The probe data thus read is counted according to preference items such as vehicle type and user age for each link (step 31).

Table 40 in FIG. 4 shows an example of probe data compiled by vehicle type. For link 1, for example, a total count of 1700 (cumulative count for a period of time) are broken down by vehicle type into 1000 sedans, 500 SUVs, and 200 compact vehicles. The probe data in this case represents the number of vehicles that traveled on link 1 during the specific time period. The probe data on links 2 and 3 is also compiled and outputted in a similar procedure.

Next, in steps 32 through 34 in FIG. 3, preference parameters are calculated based on the numbers of vehicles counted on the respective links. Considering that the number of vehicles varies between links with many vehicles counted on a link and fewer vehicles counted on another, the vehicle counts are normalized by preference item (step 32).

Based on the normalized values, the proportions (referred to as travel frequencies in the present example) accounted for by the three types of vehicles, i.e. sedans, SUVs, and compact vehicles, on each link are calculated using the total number of vehicles counted on the link as reference value 1 (step 33). The travel frequency calculated in step 33 for each preference item and link is set as preference parameter $P_{ji}$ (step 34) and stored in the preference parameter database 15. This process is repeatedly executed for every preference item and every link.

Figure 5:
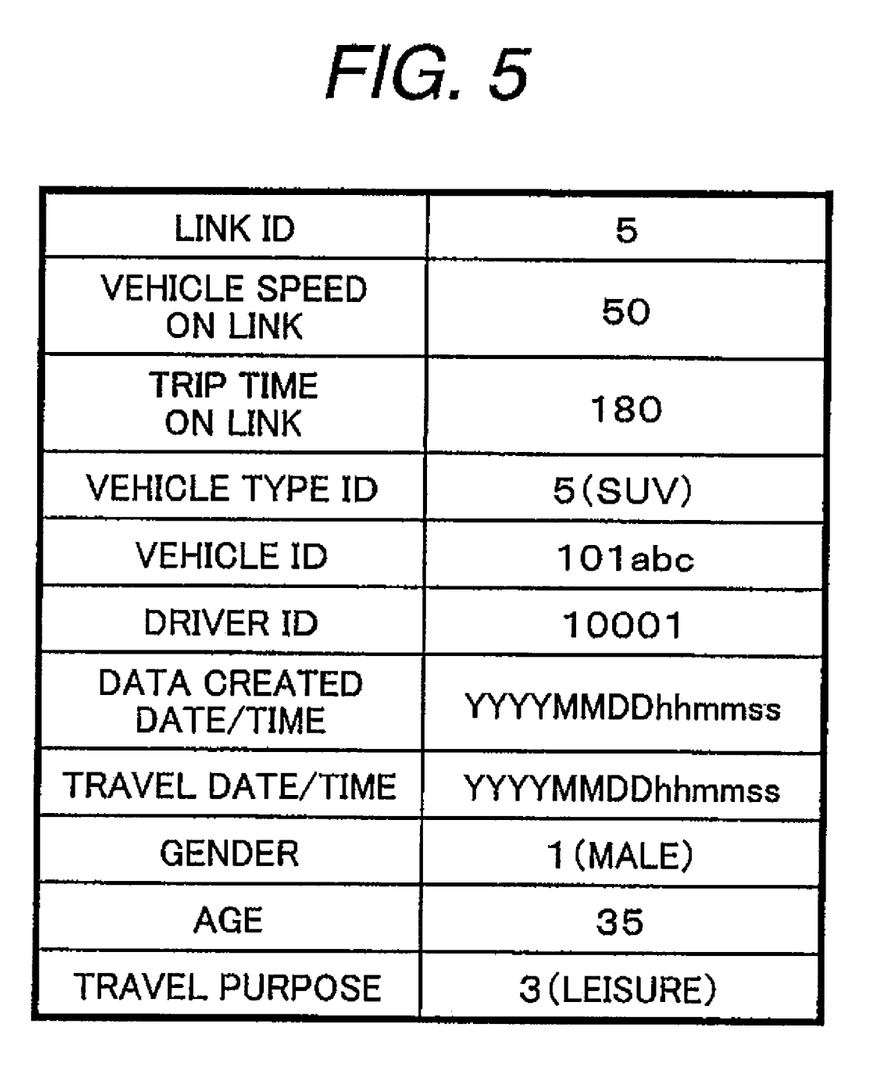
FIG. 5 is a explanatory diagram of probe data stored in a probe database 13.

FIG. 5 shows example probe data stored in the probe database 13. The probe data is created on each travel of each vehicle. The probe data includes a unique link ID, speed at which the vehicle traveled on the link and time taken by the vehicle to travel through the link, vehicle type ID, vehicle ID, ID of the driver who was driving the vehicle when the probe data was transmitted, date and time when the probe data was created, date and time when the vehicle traveled on the link, and other driver information such as gender, age, and the purpose of travel.

[Expansion of the Preference Parameter]

Figure 6:
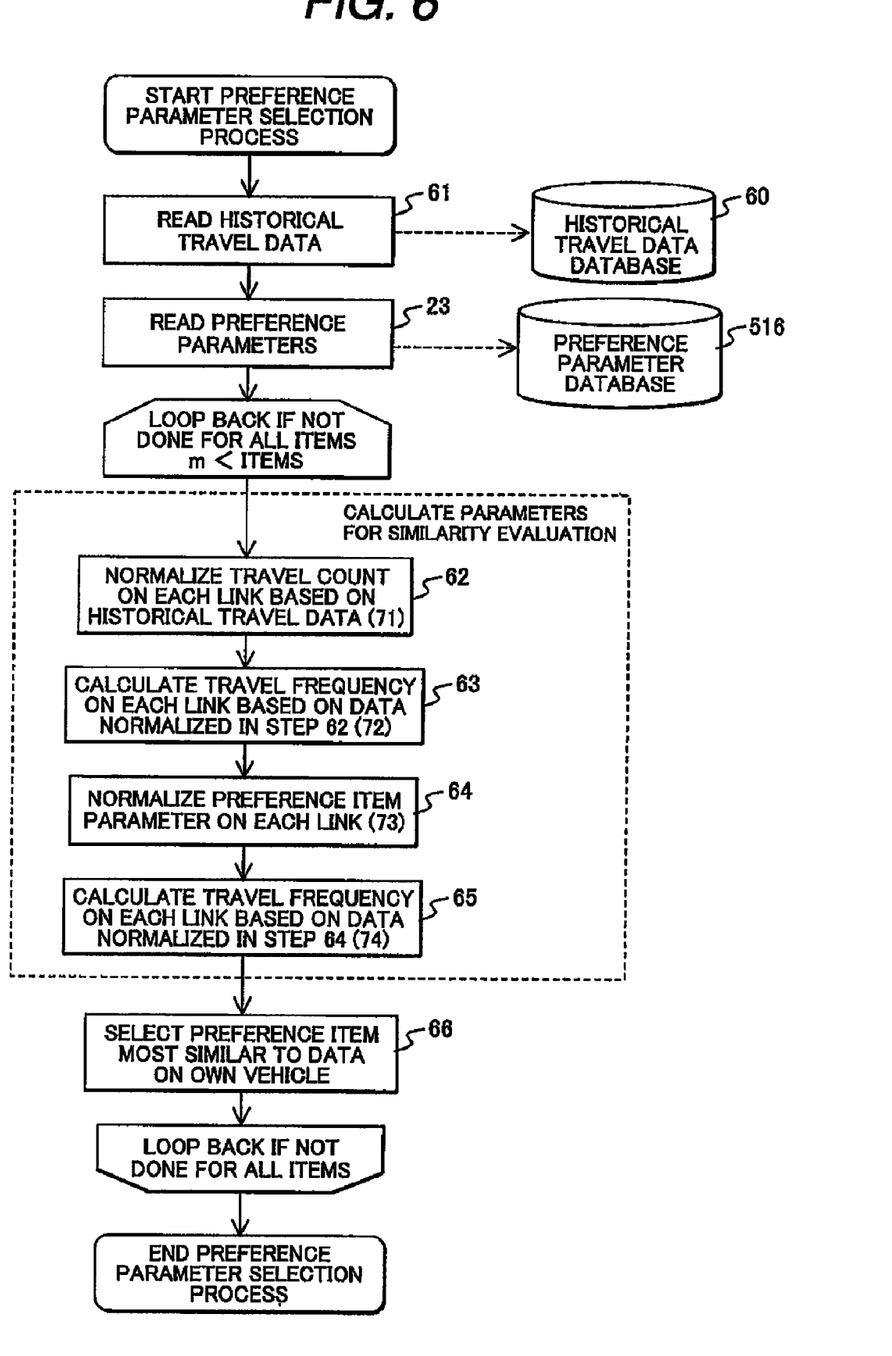
FIG. 6 is a process flowchart describing a preference parameter selection method used in the route searching unit 513.
Figure 7:
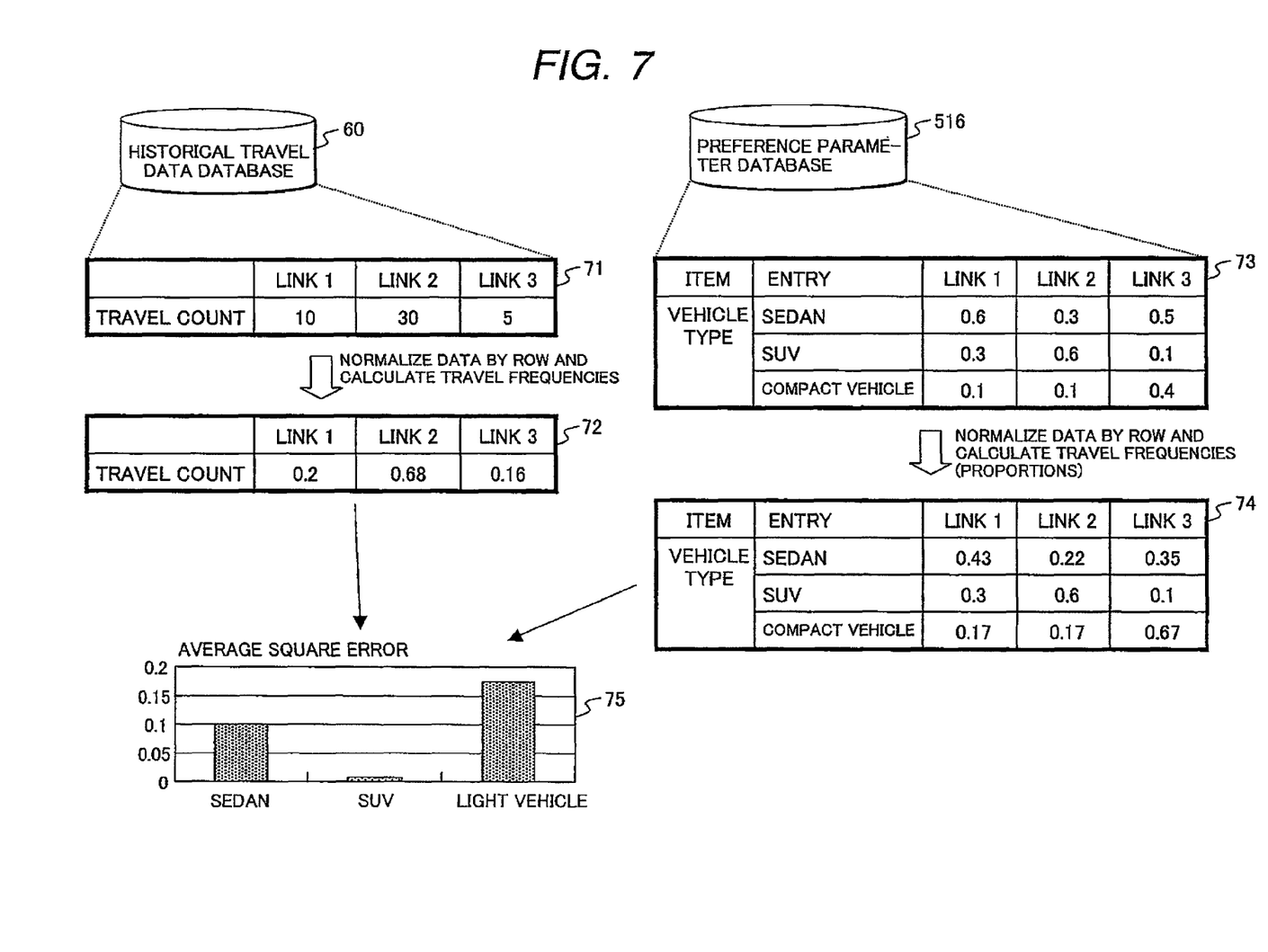
FIG. 7 is a schematic diagram for explaining the process flow shown in FIG. 6.

FIG. 6 shows an example flow of processing equivalent to an expansion of the preference parameter setting process performed in the route search unit 513 according to the present embodiment. FIG. 7 provides supplementary information for use in explaining the flow of processing shown in FIG. 6. The preference parameter selection process performed in the route searching unit 513 will be described with reference to FIGS. 6 and 7.

In the method described above, preference parameters matching the user information stored in the attribute information storing unit 519 are read from the preference parameter database 516 and then a route nearly matching the driver's preference is selected using the preference parameters and proposed to the driver.

There are however drivers who are young at heart and whose sensitivities differ from those (average values of preference items obtained from many pieces of probe data) of general people of the same generation. When the user is one of such young-hearted drivers, the preference parameters to be used are determined by an alternative procedure without selecting preference parameters matching the user information stored in the attribute information storing unit 519.

Namely, as shown in FIG. 6, user preference parameters considered to reflect the user preference are calculated based on user's historical travel data, and preference parameters similar to the user preference parameters thus calculated are selected from the preference parameter database 516.

The preference parameter selection process is started when route searching is started in the route searching unit 513. First, historical travel data on each link to be considered in route searching is read from a historical travel data database 60 (step 61). The historical travel data database 60 is included in the storage device 56 and stores a record of traveling made by the driver using the particular vehicle. Assume that, in step 61, the numbers of travels made on the respective links as shown in Table 71 in FIG. 7 are read from the historical travel data database 60.

General driver preference parameters calculated from probe data on general drivers are read, as objects of comparison, from the preference parameter database 516 (step 23). It is assumed that the preference parameters stored in the preference parameter database 516 were created in the center apparatus 1 and transmitted to the in-vehicle terminal apparatus 5 via the communication interface 11. In an alternative method, the preference parameters may be read from a removable storage medium such as a CD or memory device without using the communication interface 11.

To evaluate similarity between the historical travel data on the user and the stored general driver preference parameters so as to select preference parameters having similarity to the historical travel data, it is necessary to convert the travel data into parameters which can be compared with the stored preference parameters. The type of parameters into which the travel data is converted does not matter as long as they can be compared with the stored preference parameters.

In the following, an example case of evaluating similarity between the travel data and the stored preference parameters based on the travel frequency on each link, that is, based on how frequently each link to be considered in route searching is used will be explained.

For the present example, assume that historical travel data on links 1 to 3 is provided as shown in Table 71 included in FIG. 7. The numbers of travels varying between links are normalized based on the largest one of the numbers of travels recorded on the links to be considered (links 1 to 3) (step 62). The travel frequency on each link is calculated (step 63) based on the normalized value on each link calculated in step 62. Next, using the preference parameters on the respective links read, in step 23, from the preference parameter database 516, a value equivalent to the travel frequency on each link is calculated for the relevant preference items.

Namely, assuming that the preference parameters read in step 23 are those shown in Table 73, the preference parameter values varying between the preference items are normalized by preference item (step 64). Based on the normalized values, the travel frequency on each link is calculated (step 65), and the calculated travel frequency values, shown in Table 74, are outputted. Out of the preference items listed in Table 74, one with a travel frequency distribution similar to that shown in Table 72 is selected as a preference item very similar to the item shown in Table 72 (step 66).

In the present example, similarity between the travel frequency on each link determined based on the travel data on the user and the travel frequency on each link determined based on general driver preference parameters is evaluated based on mean square errors between the two sets of travel frequency data. In the present example, as shown in graph 75 included in FIG. 7, the average square error is the smallest for SUV, so that SUV is selected as the preference item most matching the user preference.

The links to be objects of comparison may be those road links included in the area determined according to the departure place and destination (way points may also be included) set by the user. Furthermore, of the road links included in the area, those showing higher numbers of travels than others may be selected as objects of comparison.

Reducing the number of candidate links results in reduced processing load for similarity evaluation, so that high responsiveness in route searching can be maintained even when the user preference is to be taken into consideration. Responsiveness in route searching deteriorates remarkably when the specified departure place and destination require an area exceeding a predetermined area (radius) to be covered in route searching. In such a case, it may be advisable to reduce the number of candidate links to be considered.

Figure 8:
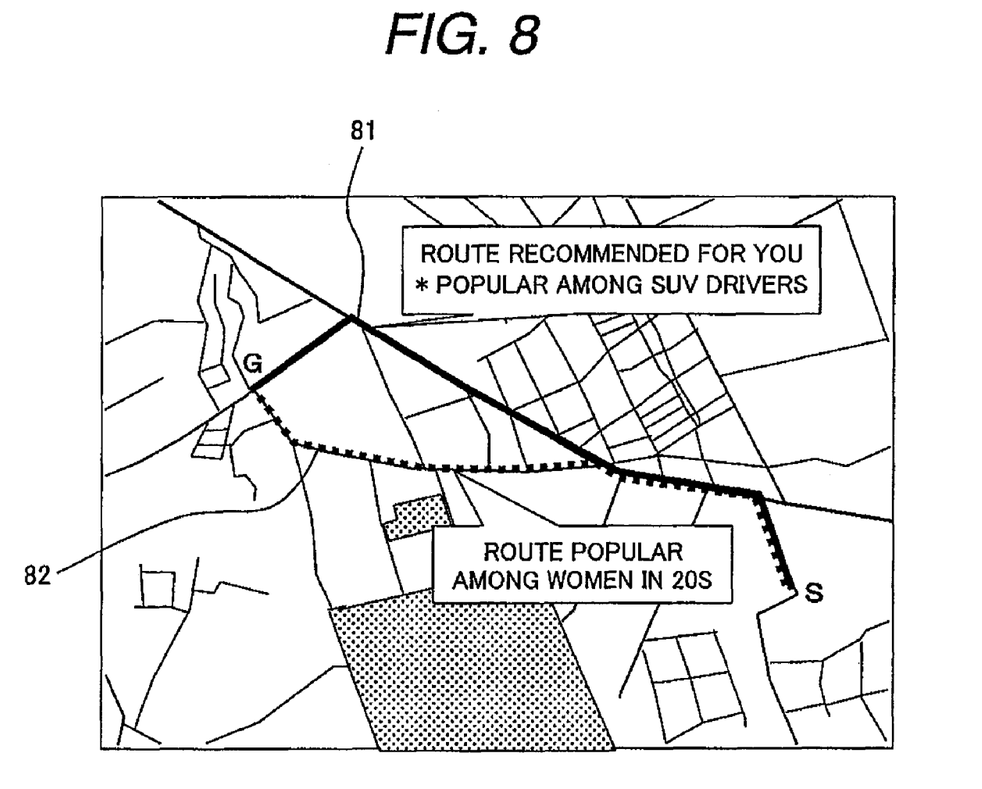
FIG. 8 is an explanatory diagram showing an example display in the route searching system according to the invention.

FIG. 8 shows an example display on the display unit 52 showing different routes selected by route searching made using different preference parameters. In FIG. 8, solid line 81 shows a route selected as most matching the user preference and broken line 82 shows a route determined using a preference parameter not matching the user preference. Searching for multiple routes in such a manner is made possible by registering multiple methods of preference pattern selection (user information 1, user information 2, - - - ) in the attribute information storing unit 519.

When the routes as shown in FIG. 8 are displayed, which one to select, the route 81 most matching the user preference or the route 82 most matching a passenger (for example, a female in the 20s), is up to the user. The user can select either route, for example, by aligning the cursor on the desired route displayed and pressing the ENTER KEY, by repeatedly pressing a predetermined key until the desired route is selected on the display, by keying in the route number of the desired route, or by voice recognition.

As described above, using, on the own vehicle, preference parameters created from probe data on general vehicles makes it possible to find routes on which the own vehicle has not traveled but which reflect the driver preference. Furthermore, using more than one method of preference parameter selection makes it possible to find, in addition to a route most matching the user preference, multiple routes which meet the preference of multiple drivers and passengers varying in preference. Thus, sharing the know-how of multiple drivers having similar purposes and preferences makes it possible to find convenient routes which can be traveled easily and safely.

In the present embodiment, preference parameters are calculated based on preference items which are set using the user attribute information stored in the attribute information storing unit 519, the user attribute information being considered to include factors for route selection.

Therefore, when the attribute information is increased, for example, by increasing the variety of vehicle types, passengers, and travel purposes or by setting additional attributes, the numbers of preference items and preference parameters increase. Preference parameters are set for each road link (and, possibly, for each time period) (Table 28). A larger number of preference parameters require the preference parameter database 516 to be larger.

There are cases in which the storage device 56 included in the in-vehicle terminal apparatus 5 is used to store not only map and other navigation-related information but also audio and video data, so that efficient use of the storage device 56 is desirable.

Furthermore, in cases where the cost adjustment method as represented by Equation 1 is used, increasing the number of items j increases the cost adjustment load, possibly deteriorating the responsiveness in route searching. Hence, a preference item consolidation means aimed at decreasing the number of preference parameters by consolidating correlated preference parameters is additionally provided.

[Preference Parameter Consolidation]

Figure 9:
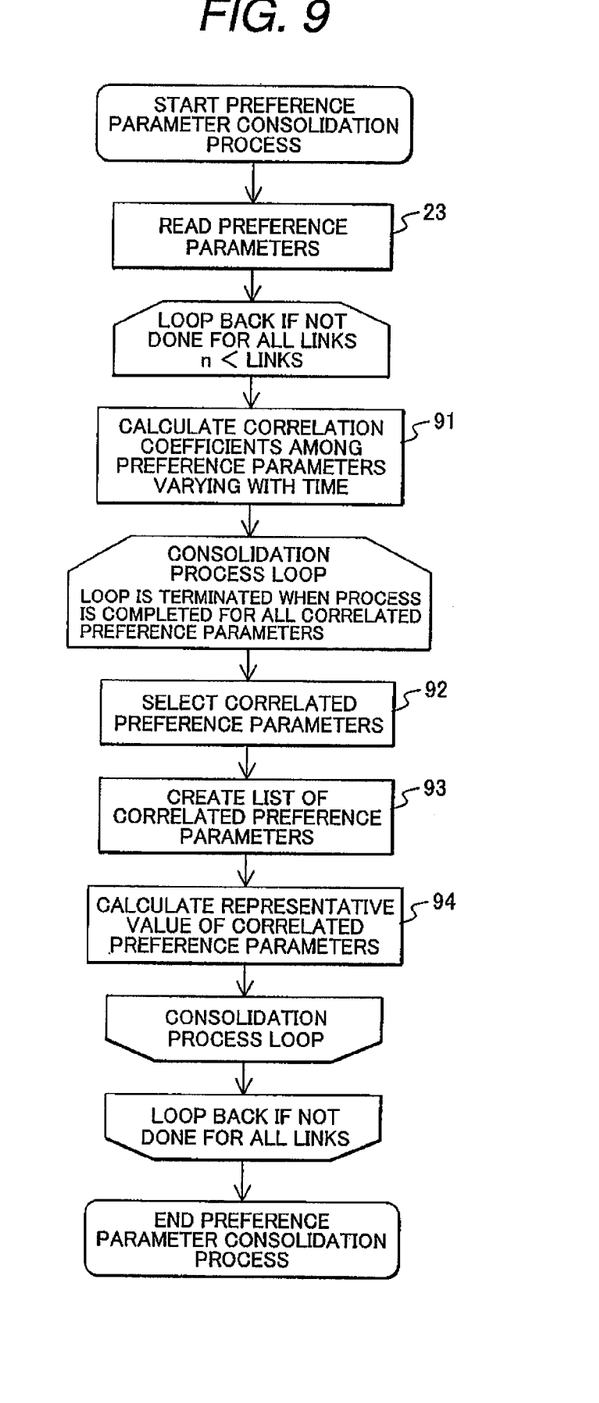
FIG. 9 is a process flowchart describing a preference parameter consolidation procedure.

FIG. 9 is a flowchart of a preference parameter consolidation process. This process is executed in the preference parameter creating unit 14 after the preference parameters are calculated in the process shown in FIG. 3.

First, preference parameters stored in the preference parameter database 516 are read (step 23), and correlation coefficients among preference parameters whose values vary with time are calculated (step 91). The correlated preference parameters are then selected (step 92), and a list of the correlated preference parameters is created so that the preference parameters being consolidated can be known (step 93).

An average parameter value of the selected correlated preference parameters is calculated as a consolidated preference parameter value, i.e. a representative value of the selected correlated preference parameters (step 94). Instead of such an average parameter value, the value of one of the selected correlated preference parameters may be made a representative value.

Steps 92 to 94 are repeated until all groups of correlated preference parameters have been subjected to the consolidation process. The preference parameters each of which is correlated with no other preference parameters are left as they are. The preference parameter consolidation process is terminated when it has been performed for all links to be considered.

Figure 10:
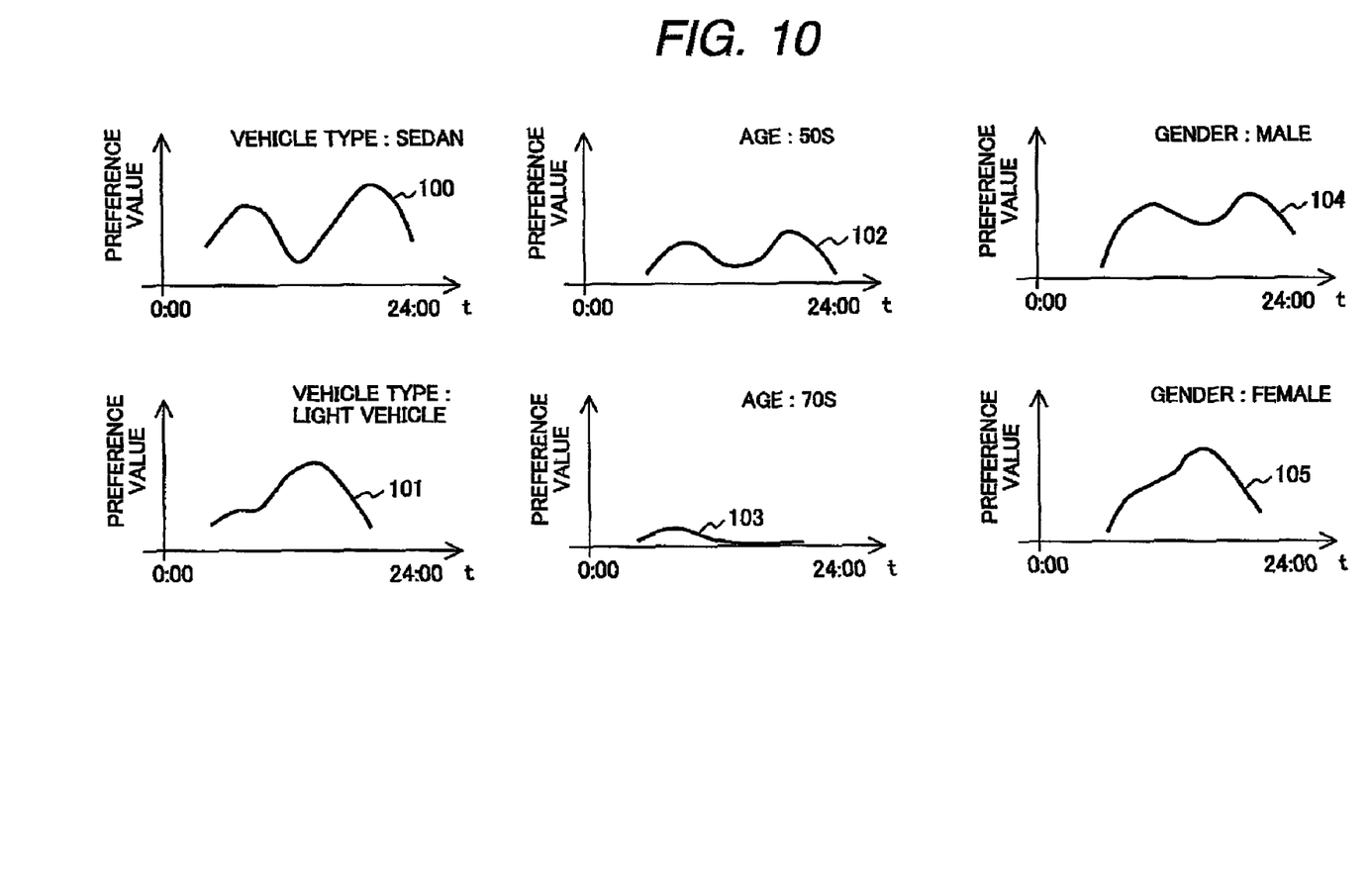
FIG. 10 is a graph for explaining the preference parameter consolidation procedure.

FIG. 10 shows graphs for supplementarily explaining the process shown in FIG. 9. Graphs 100 to 105 show preference parameter value variations with time during a day. In each graph, the horizontal axis represents time t, and the vertical axis represents the value of a preference parameter determined by the method as shown in FIGS. 3 and 4. For the preference parameters whose values vary with time, correlation coefficients are calculated (step 91), and the correlated preference parameters are consolidated into one preference parameter. It is advisable to assign a name for identification to such a consolidated preference parameter.

If, out of the preference parameters shown in FIG. 10, the vehicle type sedan, the age 50s, and the gender male are determined to be correlated, the three preference parameters are consolidated into a consolidated preference parameter named, for example, "preference of refined middle-aged male."

The consolidated preference parameter thus created is supplied to the in-vehicle terminal apparatus 5. In the in-vehicle terminal apparatus 5, consolidated preference parameters are stored in the preference parameter database 516. When route searching is carried out in the route searching unit 513, the consolidated preference parameters stored in the preference parameter database 516 can be referred to.

Which one of the consolidated preference parameters agrees with the user preference is determined based on the user attribute information stored in the attribute information storing unit 519. Namely, it is determined by comparing the list of the preference parameters reflected in the consolidated preference parameters with the user attribute information.

The preference parameter list and consolidated preference parameters are supplied from the center apparatus 1. An alternative method may also be used in which: a consolidated preference parameter for the user is created, as done in the process shown in FIG. 9, based on the correlationship between preference parameters created, as shown in FIG. 6, from the historical travel data on the user; and, out of the consolidated preference parameters stored in the preference parameter database 516, one similar to the user-specific consolidated preference parameter is selected.

In the present embodiment, a consolidated preference parameter is created for each link based on correlationships between preference parameters whose values vary with time. There are, however, cases in which a preference parameter correlationship is found, for example, between a link used by many for shopping purposes and a link used by many female drivers. Hence, it may also be considered to consolidate preference parameters based on usage data on multiple links.

As described above, consolidating preference parameters makes it possible to find routes meeting user's preference while preventing the storage area for storing preference parameters from expanding.

What is claimed is:

1. A route searching method for execution by a computer for finding a recommended route from a departure place to a destination,
wherein the computer stores preference parameters calculated as usage frequencies of preference items by using probe data collected from a plurality of vehicles,
wherein each usage frequency is a ratio of a number of travel counts of the respective preference item for a road link to a number of total travel counts for the road link, and
wherein the computer executes the steps of:
receiving location information specifying a departure place and a destination;
selecting, out of the preference parameters, at least one preference parameter similar to user attribute data;
adjusting, based on the selected preference parameter, a cost of each road link such that the cost decreases as a match between the selected preference parameter and a user's preference increases; and
determining, based on the adjusted cost of each road link, a minimum-cost route from a departure place to a destination.

2. The route searching method according to claim 1,
wherein the preference items comprise information which can be factors for route selection on such items as vehicle type, driver age, driver gender, travel purpose, and passengers, and
wherein the user attribute data comprises information which indicate characteristics of a user or vehicle on such items as vehicle type, driver age, driver gender, travel purpose, and passengers.

3. The route searching method according to claim 1, wherein the step of selecting, out of the preference parameters, at least one preference parameter similar to user attribute data includes the steps of:
determining, based on user vehicle travel data, a route preference of the user; and
selecting, out of the preference parameters, at least one preference parameter similar to the route preference of the user.

4. A route searching system for finding a recommended route from a departure place to a destination, comprising:
an in-vehicle terminal apparatus which transmits travel data as probe data, the travel data including location information, time information, vehicle information such as information on brake and wiper operations, and travel environment information such as atmospheric temperature and road surface temperature information, and
a center apparatus provided with a probe data storing unit which stores the probe data transmitted from the in-vehicle terminal apparatus,
wherein the center apparatus includes:
a preference parameter calculation unit which calculates preference parameters as usage frequencies of preference items by using probe data collected from a plurality of vehicles, wherein each usage frequency is a ratio of a number of travel counts of the respective preference item for a road link to a number of total travel counts for the road link; and
a communication unit which transmits the preference parameters when requested from the in-vehicle terminal apparatus, and
wherein the in-vehicle terminal apparatus includes:
a location information input unit which receives location information specifying a departure place and a destination;
an attribute information storing unit which stores attribute information on such items as vehicle, driver, and passenger;
a communication unit which requests the center apparatus to transmit at least one preference parameter similar to the attribute information and receives the transmitted preference parameter;

a link cost adjusting unit which adjusts a cost of each link according to the received preference parameter such that the cost decreases as a match between the received preference parameter and a user's preference increases;

a route searching unit which determines, based on the adjusted link cost, a minimum-cost route from a departure place to a destination; and a route presentation unit which presents, using a display device or by voice, route information obtained using the route searching unit to the user.

5. The route searching system according to claim 4, wherein the center apparatus further includes a preference parameter consolidation unit which consolidates correlated ones of the preference parameters into a consolidated preference parameter.

6. A route searching system for finding a recommended route from a departure place to a destination, comprising:

an in-vehicle terminal apparatus which transmits travel data as probe data, the travel data including location information, time information, vehicle information such as information on brake and wiper operations, and travel environment information such as atmospheric temperature and road surface temperature information, and a center apparatus provided with a probe data storing unit which stores the probe data transmitted from the in-vehicle terminal apparatus, wherein the center apparatus includes:

a preference parameter calculation unit which calculates preference parameters as usage frequencies of preference items by using probe data collected from a plurality of vehicles, wherein each usage frequency is a ratio of a number of travel counts of the respective preference item for a road link to a number of total travel counts for the road link;

a preference parameter storing unit which stores the calculated preference parameters;

a request receiving unit which receives a request for route searching from the in-vehicle terminal apparatus, the request including attribute information on such items as vehicle, driver, and passenger and location information specifying a departure place and a destination;

a route searching unit which selects at least one preference parameter similar to the collected attribute information from the preference parameter storing unit, adjusts costs of links to be considered in route searching according to the selected preference parameter such that the cost decreases as a match between the selected preference parameter and a user's preference increases, and determines a minimum-cost route from a departure place to a destination; and a transmission unit which transmits information on the determined route to the in-vehicle terminal apparatus, and wherein the in-vehicle terminal apparatus includes:

a location information input unit which receives location information specifying a departure place and a destination;

an attribute information storing unit which stores attribute information on such items as vehicle, driver, and passenger;

a route request unit which requests the center apparatus to search for a route to a destination;

a receiving unit which receives route information from the center apparatus; and a route presentation unit which presents, using a display device or by voice, the received route information to the user.

7. A route searching system for finding a recommended route from a departure place to a destination, comprising:

an in-vehicle terminal apparatus which transmits travel data as probe data, the travel data including location information, time information, vehicle information such as information on brake and wiper operations, and travel environment information such as atmospheric temperature and road surface temperature information, and a center apparatus provided with a probe data storing unit which stores the probe data transmitted from the in-vehicle terminal apparatus, wherein the center apparatus includes:

a preference parameter calculation unit which calculates preference parameters as usage frequencies of preference items by using probe data collected from a plurality of vehicles, wherein each usage frequency is a ratio of a number of travel counts of the respective preference item for a road link to a number of total travel counts for the road link;

a preference parameter storing unit which stores the preference parameters;

a request receiving unit which receives a request for route searching from the in-vehicle terminal apparatus, the request including location information specifying a departure place and a destination;

a route preference calculation unit which determines a route preference of the vehicle based on the travel data stored in the probe data storing unit;

a route searching unit which selects at least one preference parameter similar to the route preference of the vehicle from the preference parameter storing unit, adjusts costs of links to be considered in route searching according to the selected preference parameter such that a cost decreases as a match between the selected preference parameter and a user's preference increases, and determines a minimum-cost route from a departure place to a destination; and a transmission unit which transmits information on the determined route to the in-vehicle terminal apparatus, and wherein the in-vehicle terminal apparatus includes:

a location information input unit which receives location information specifying a departure place and a destination;

an attribute information storing unit which stores attribute information on such items as vehicle, driver, and passenger;

a route request unit which requests the center apparatus to search for a route to a destination;

a receiving unit which receives route information from the center apparatus; and a route presentation unit which presents, using a display device or by voice, the received route information to the user.

8. A navigation apparatus for finding a recommended route from a departure place to a destination and guiding a user to the destination, comprising:

a preference parameter storing unit which stores preference parameters calculated as usage frequencies of preference items by using probe data collected from a plurality of vehicles, wherein each usage frequency is a ratio of a number of travel counts of the respective preference item for a road link to a number of total travel counts for the road link;

an attribute information storing unit which stores user attribute data; and a route searching unit which selects at least one preference parameter similar to the attribute data, adjusts a cost of each link according to the selected preference parameter such that the cost decreases as a match between the selected preference parameter and a user's preference increases, and determines a minimum-cost route from a departure place to a destination.

9. The navigation apparatus according to claim 8, further comprising a travel data storing unit which stores travel data on an own vehicle, wherein the user attribute data represents a route preference calculated from the travel data.

10. The navigation apparatus according to claim 8, further comprising a preference parameter updating unit which updates, by communication or via a portable recording medium, the preference parameters stored in the preference parameter storing unit.

* * * * *